United States Patent [19]
Haagenson

[11] Patent Number: 5,310,585
[45] Date of Patent: May 10, 1994

[54] DECORATIVE ARTICLE MADE OF PRESERVED SPRIGS

[76] Inventor: Marsha K. Haagenson, 2825 Brookwood Ter., Minneapolis, Minn. 55410

[21] Appl. No.: 800,416
[22] Filed: Nov. 29, 1991
[51] Int. Cl.$^5$ ............................ A01N 3/00; A47G 7/00
[52] U.S. Cl. ...................... 428/15; D11/118; 428/22
[58] Field of Search .............. 428/11, 15, 21, 23, 428/22; 156/61, 57; 248/27.8; 427/4; D11/118

[56] References Cited

U.S. PATENT DOCUMENTS

| | | | |
|---|---|---|---|
| D. 163,517 | 6/1951 | Hansen | D11/118 |
| D. 197,364 | 1/1964 | Rotondo | D11/118 X |
| D. 264,015 | 4/1982 | Criveller | D1/115 |
| 2,097,513 | 11/1937 | Casey | 428/18 |
| 2,851,807 | 9/1958 | Taylor | 428/19 |
| 3,132,988 | 5/1964 | Fowler | 428/11 |
| 3,857,747 | 12/1974 | Bitecola | D11/118 X |
| 3,895,140 | 7/1975 | Sheldon et al. | 428/22 |
| 3,979,837 | 9/1976 | Kanakis | 34/9 |
| 4,221,078 | 9/1980 | Latham et al. | 428/13 X |
| 4,272,571 | 6/1981 | Romero-Sierra et al. | 428/24 |
| 4,445,298 | 5/1984 | Roder | 428/23 X |
| 4,606,950 | 8/1986 | Corbet | 428/23 |

FOREIGN PATENT DOCUMENTS

| | | | |
|---|---|---|---|
| 575031 | 4/1959 | Canada | 428/21 |
| 3767 | of 1882 | United Kingdom | 428/21 |

OTHER PUBLICATIONS

Winter 1991-92 Catalog from Winterthur The Cover and p. 21.

Primary Examiner—Henry F. Epstein
Attorney, Agent, or Firm—Edward Schwarz

[57] ABSTRACT

A decorative article of manufacture has a penetrable core into which the ends of sprigs are inserted. Leaves forming the ends of the sprigs preferably conceal the core completely. The sprigs include preserved leaves on the unsupported projecting ends which define an approximate geometric shape. The sprigs have their natural leaves on their unsupported ends and are preferably form of preserved eucalyptus The core is preferably formed of a rigid plastic foam. The geometric shape defined by the sprigs' ends may have for example a conical, semi-conical, toroidal, or spherical shape.

9 Claims, 1 Drawing Sheet

DECORATIVE ARTICLE MADE OF PRESERVED SPRIGS

BACKGROUND

It goes without saying that it is very common to decorate the interiors of dwellings with many different types of materials in many different shapes. For example, sculptures may be made of everything from steel to papiermache. The appearance and texture of such sculptures is strongly influenced by the choice of materials. It is also possible to make decorations from natural materials such as dried or preserved flowers, leaves, or grasses. By proper selection of the type of material from which a particular decoration is made, the aesthetic appeal can be strongly enhanced.

It is possible to preserve certain types of vegetation from leafy trees and bushes by impregnating this vegetation with glycerine or other preservative liquid using well known procedures. By so doing, this vegetation will hold its leaves and appear to be fresh for a very long time, typically a number of years. This process is particularly suitable for preserving eucalyptus vegetation. Typically, the eucalyptus branches are dyed a dark green during the preservation process. Preserved eucalyptus is available from most floral supply concerns in bunches comprising a plurality of long branches. The ability of the eucalyptus odor to emanate from the leaves and branches is not impaired by this preservation process.

BRIEF DESCRIPTION OF THE INVENTION

A decorative article of manufacture comprises a penetrable core and a outside decorative covering comprising a plurality of preserved sprigs each comprising a stem having leaves at a first end and a bare second end embedded in the core. These leafy ends define an approximate geometric shape such as a cone, a longitudinally sectioned cone (hemi-cone), a sphere, or a toroid. Preferably the core comprises rigid plastic foam.

DESCRIPTION OF THE PREFERRED EMBODIMENT

Figure 1:
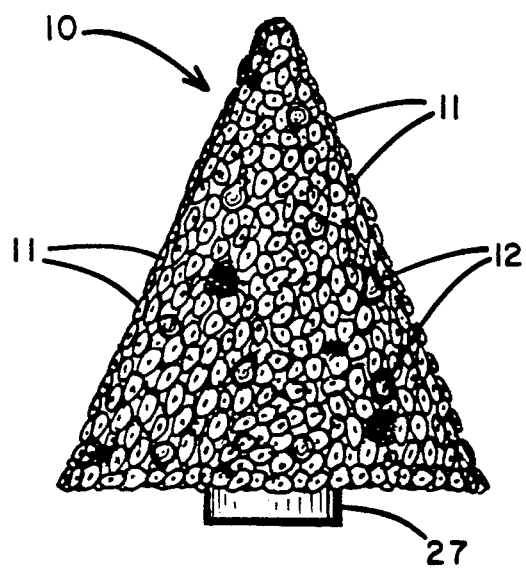
FIG. 1 is a side view of a three dimensional conical decorative article embodying the invention.

In FIG. 1, a preferred embodiment of the decorative article 10 comprising the invention is shown as a three dimensional object having a generally conical shape, and whose surface is defined by a plurality of leafy ends 11, each leafy end 11 being carried by the natural sprig on which the leaves originally grew. Preferably the sprigs and leafy ends comprise preserved eucalyptus vegetation. A base 27 supports the article. In one preferred embodiment, the conical shape has a subtended angle at the apex of approximately 60° although other angles may be aesthetically suitable also.

Figure 3:
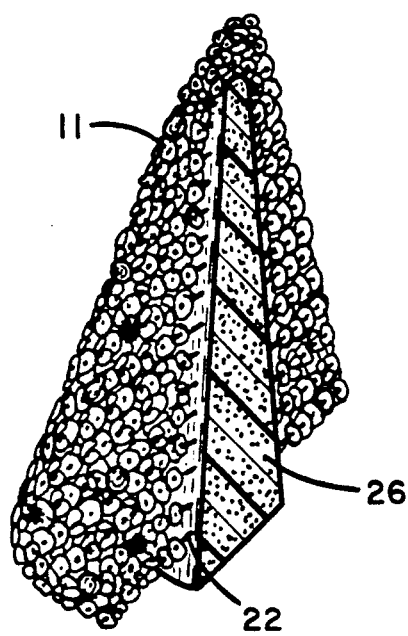
FIG. 3 shows a perspective view of a hemi-conical decorative article embodying the invention
Figure 2:
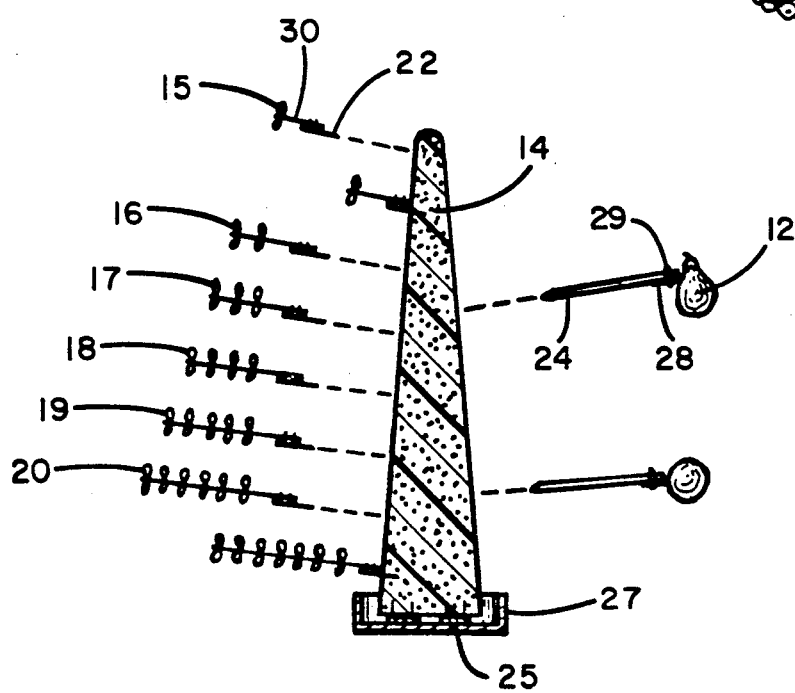
FIG. 2 shows the interior structure of the decorative article of FIG. 1, with parts of the article shown in exploded form.

The structure of the article of FIG. 1 is shown in FIG. 2 as having a central core comprising a cone 14 made of a penetrable rigid plastic foam supporting a plurality of preserved eucalyptus sprigs comprising individual stems 30 with one or more sets of leaves 15-20. The length of a suitable cone 14 may be 12 in. (30 cm.), 15 in. (37.5 cm.), or 18 in. (45 cm.). The angle subtended at the apex of cone 14 may be approximately 8°. The rear view of the hemi-cone embodiment shown in FIG. 3 is completely analogous to the conical article of FIG. 1 and is helpful in further revealing the interior structure of the article. With a conical core 14 with these dimensions and using eucalyptus sprigs the individual eucalyptus sprigs should have lengths which vary with the vertical position which they occupy on the cone 14. The length of the sprigs should generally increase with the distance from the apex of the conical core at which they are set. Those sprigs at the top preferably have a single set of leaves 15 at the first ends thereof, the sprig itself being perhaps 1 to 2 in. (2.5 to 5 cm.) long from one end of the stem 30 to the leaves 15. The sprigs for mounting below the top set of sprigs (having leaves 15) may carry two sets of leaves 16 longitudinally along its length and adjacent its first end. Successively lower levels of sprigs may have respectively three, four, five, and six sets of leaves 17, 18, 19, and 20 along their stems 30 and adjacent their first ends. All of the sprigs carrying the same number of leaf sets 15-20 should have approximately the same length. Sprigs having an excess of leaf sets 15-20 may be trimmed either before or after being mounted in core 14 so that the end leaves of the individual sprigs collectively define the approximate con shape desired. The individual sprigs may be cut from the longer branches described above and available from most floral supply concerns. While it might seem that it would be sufficient for each level of sprigs to have only one or two sets of leaves, in practice the aesthetic appearance of fullness of the finished article's vegetation appears to require approximately the number of leaf sets 15-20 specified at each level. However, it is very possible that fewer sets of leaves may be used at the lower levels without seriously affecting the aesthetics of the finished article.

Each individual sprig has a second end by which the entire sprig is mounted to the cone 14. Individual stems should be mounted at an angle varying from 0° to perhaps 20° from the horizontal. The density of sprigs on a cone 14 should be approximately 1-3 sprigs per square inch of cone 14 surface depending on the size of the individual leaves on a stem 30, but in any case the density should sufficient to completely cover core 14 and conceal the core from sight.

I prefer to use a clamp-on pick element 22 to mount each sprig on the cone 14. These picks 22 are attached to the second ends of the individual sprigs by use of a floral stemming machine such as that available from B & K Tool Die & Stamping Co., Inc., New York, N.Y. from which picks 22 are also available. On occasion, two sprigs may be mounted on a single pick 22. Suitable cones 14 are available from any floral supply concern. The assembled article is formed by forcing sprig-carrying picks 22 into the penetrable plastic foam comprising cone 14 to a point where the end of the stem 30 is very close to the surface of core 14. The penetrable plastic material is sufficiently rigid to support its sprig in the desired position. Barbs on the picks 22 hold the picks firmly within the rigid foam.

The article may be further decorated with a plurality of colored plastic or other artificial fruit pieces 12. These fruit pieces 12 are typically supplied with projecting stems. A second type of pick 24 is formed of an elongated wood or plastic shaft with a thin flexible wire 29 fastened to one end 28. These picks are substantially longer than the metal picks 22 for clamping onto the ends of sprigs. They are typically used for the purpose of supporting fresh or artificial flowers in an arrangement. Both these wire-end picks 24 and the artificial fruit pieces 12 are also available from floral supply concerns. The wire 29 at the end of each pick 24 is wound around the stem of a fruit piece 12 and then the end of each pick 24 opposite end 28 is forced into the cone 14 so that the fruit piece 12 is approximately flush with the ends leaves of the surrounding sprigs.

Cone 14 is supported in a hollow plastic base 27 whose interior bottom surface is glued by hot melt or other type of adhesive to plastic mounting fixtures 25 which have prongs penetrating the base of cone 14. The sides of base 27 conceal the bottom of the cone 14 thereby further improving the appearance of the finished article.

While the shape of the article which I presently prefer is conical, other shapes are also possible. For example, the hemi-conical article shown in FIG. 3 may be formed according to the invention using a hemi-conical interior core 26 also made of the same penetrable rigid foam plastic. A hemi-conical core 26 is formed by slicing a cone such as that comprising the core 14 of FIGS. 1 and 2 along a plane in which the axis of the cone lies. The sprigs are set only on the curved surface of a hemi-conical cone and according to the specifications described for the complete cone 14 of FIGS. 1 and 2. Such an article may be mounted flush on a wall or set on a narrow ledge or shelf.

It is also possible to construct a spherical article according to the invention. Such an article may be suspended from the ceiling by a string or thread.

A toroidal article may also be formed according to the invention. Such an article may be placed on a horizontal surface as a decoration, perhaps with a candle (not to be lit for safety's sake) placed in the interior opening.

The preceding has described my invention. What I wish to claim is:

1. An article of manufacture comprising a penetrable core and an outside decorative covering comprising a plurality of preserved sprigs each having leaves at a first end and a second end embedded in the core, leaves at the first ends cooperatively defining an approximate geometric shape, said article having a sufficient number of leaves to substantially conceal the core from view.

2. The article of claim 1, wherein the sprigs are preserved eucalyptus.

3. The article of claim 2, wherein the approximate geometric shape is a cone.

4. The article of claim 3 wherein the core comprises a rigid plastic foam material 5. The article of claim 4, wherein the core has the shape of a cone.

6. The article of claim 5, wherein the lengths of the springs generally increase with the distance from the apex of the conical core to where each sprig is located.

7. The article of claim 5, further comprising a plurality of artificial fruit, each having a stem projecting therefrom, a plurality of picks each comprising an elongated shaft having wire wound around a first end thereof and the stem of an artificial fruit, and having a second end, each elongated shaft having its second end embedded in the core.

8. The article of claim 1, further comprising a plurality of artificial fruit, each having a stem projecting therefrom, a plurality of picks each comprising an elongated shaft having wire wound around a first end thereof and the stem of an artificial fruit, and having a second end, each elongated shaft having its second end embedded in the core.

9. The article of claim 1, wherein the approximate geometric shape is a cone, and wherein the length of the sprigs generally increase with their distance from the apex of the cone.

* * * * *